Aug. 17, 1954  W. A. JOHNSON ET AL  2,686,587
APPARATUS FOR HANDLING POTTERY WARE MOLDS
Filed Feb. 24, 1950  12 Sheets-Sheet 1

INVENTOR.
WALTER A. JOHNSON
BY + NORMAN I. SEBELL
Bodell + Thompson
ATTORNEYS

Fig. 2

Aug. 17, 1954  W. A. JOHNSON ET AL  2,686,587
APPARATUS FOR HANDLING POTTERY WARE MOLDS
Filed Feb. 24, 1950  12 Sheets-Sheet 4

INVENTOR.
WALTER A. JOHNSON
+ NORMAN I. SEBELL
BY Bodell + Thompson
ATTORNEYS

Aug. 17, 1954  W. A. JOHNSON ET AL  2,686,587
APPARATUS FOR HANDLING POTTERY WARE MOLDS
Filed Feb. 24, 1950  12 Sheets-Sheet 12

INVENTOR.
WALTER A. JOHNSON
+ NORMAN I. SEBELL
BY
Bodell + Thompson
ATTORNEYS

Patented Aug. 17, 1954

2,686,587

UNITED STATES PATENT OFFICE 2,686,587

APPARATUS FOR HANDLING POTTERY WARE MOLDS

Walter A. Johnson, Syracuse, and Norman I. Sebell, Dewitt, N. Y., assignors to Onondaga Pottery Company, Syracuse, N. Y., a corporation of New York Application February 24, 1950, Serial No. 146,054

3 Claims. (Cl. 198—31)

This invention relates to apparatus for handling pottery ware moulds, and more particularly to apparatus for automatically removing moulds with ware formed thereon from the turret of a jiggering machine, advancing the moulds through a drying oven, and returning empty moulds to the jigger turret.

The invention has as an object apparatus of the type referred to embodying a particularly compact structure of simple arrangment which is capable of handling the moulds efficiently at high speeds without damage to the moulds, or the newly formed ware therein, and which functions over long periods of operation with unusually little maintenance.

The invention consists in the novel features and in the combinations and constructions hereinafter set forth and claimed.

In describing this invention, reference is had to the accompanying drawings in which like characters designate corresponding parts in all the views.

The ware forming machine is shown generally in Figures 5, 7, 8 and 12, and is of the turret type, wherein the moulds, in which or on which the ware is formed, are advanced to and from the jigger spindle by a turret mould carrier. The moulds, with a quantity of plastic clay therein or thereon, are moved by the mould carrying turret to the jigger spindle on which the moulds are deposited and are rotated by the spindle while the ware forming tool is moved into engagement with the clay to form the ware. The actuating or drive mechanism of the forming machine is enclosed in a cabinet having a flat top wall 20.

Figures 3, 16:
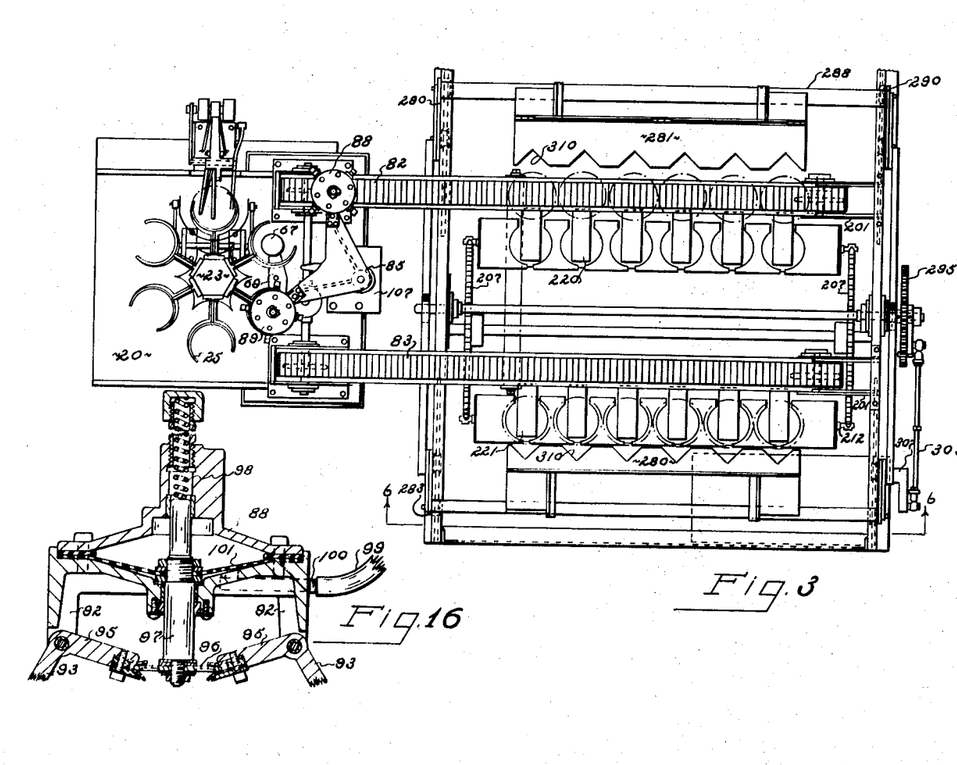
Figure 3 is a view taken on line 3—3, Figure 1.
Figure 16 is a sectional view taken on line 16—16, Figure 4.
Figure 5:
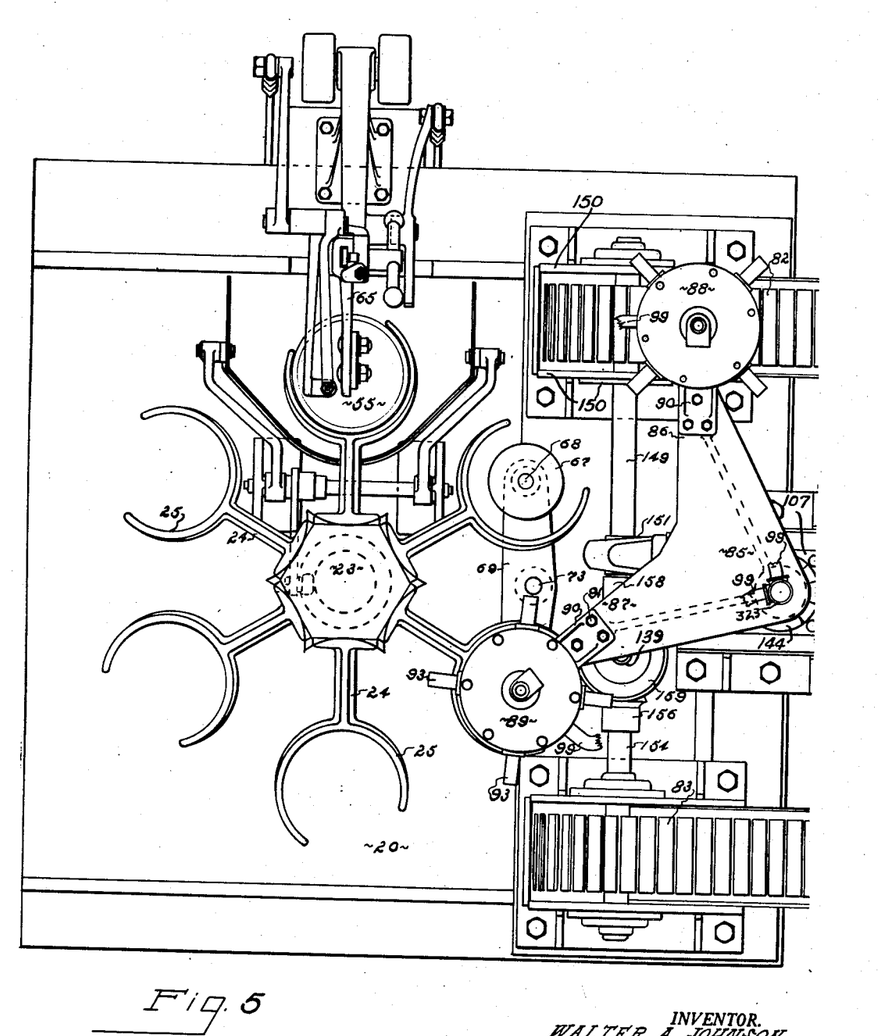
Figure 5 is an enlarged top plan view of the ware forming machine and contiguous portions of the mould conveyors.

A spindle support 21 is mounted centrally on the top 20, and a spindle 22 is journalled vertically in the support 21 and has affixed to its upper end the mould carrying turret 23 which is formed with radially extending arms 24 terminating at their outer ends in circular mould supports 25. These supports are open at one side, as shown in Figures 3 and 5. The turret is indexed or rotated intermittently by a Geneva disk 26, Figure 12, formed with slots 27 to receive a roller 28 carried on the free end of a crank arm 29, see Figure 7. The crank arm 29 is affixed to the upper end of a shaft 30 journalled vertically in a hub portion 31 of a bracket having side arms 32 affixed to the under side of the top plate 20 and depending therefrom. A beveled gear 33 is affixed to the lower end of the shaft 30 and is arranged in mesh with a similar gear 34 fixed to a shaft 35 extending horizontally and journalled in the depending arms 32 of the supporting bracket. The shaft 35 is rotated by a motor 36 mounted in the cabinet, the drive being effected by a transmission belt 40 connecting the motor to a gear reducing unit 41, the output shaft of which is connected to the main shaft 35, see Figures 7 and 12.

Figure 7:
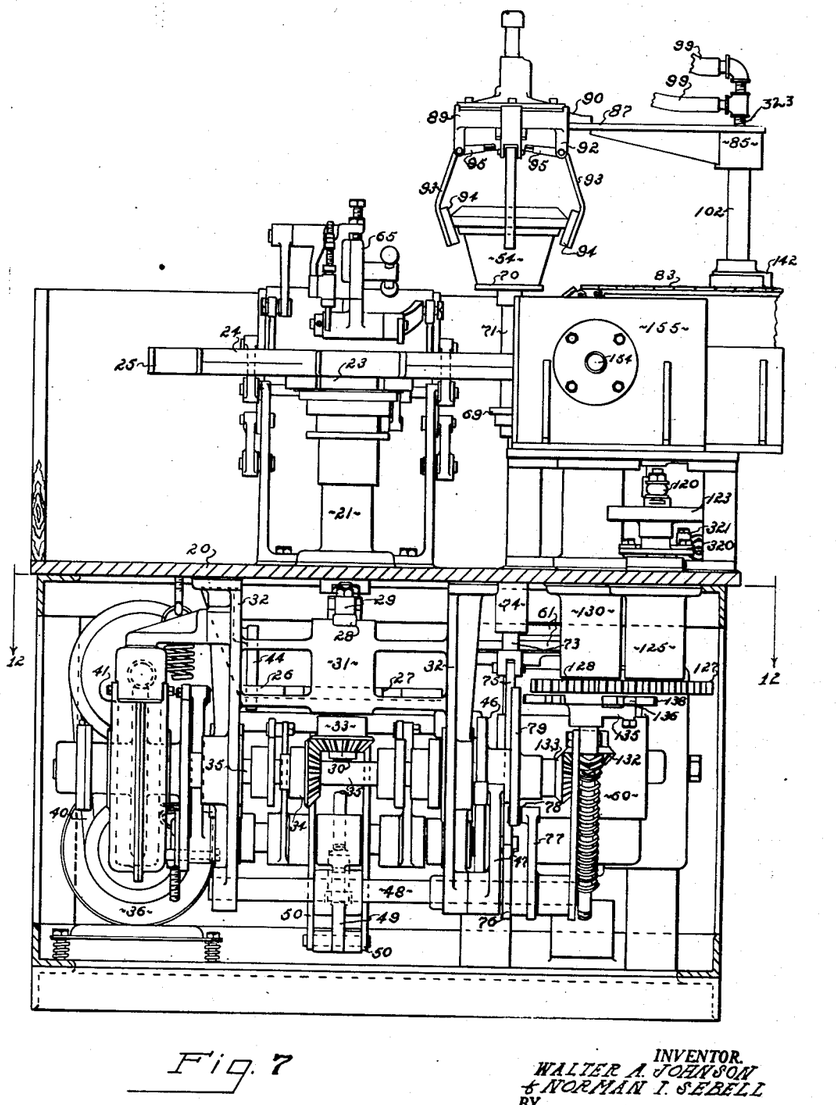
Figure 7 is an enlarged front elevational view, partly in section, of the left hand portion of the structure shown in Figure 1.
Figure 12:
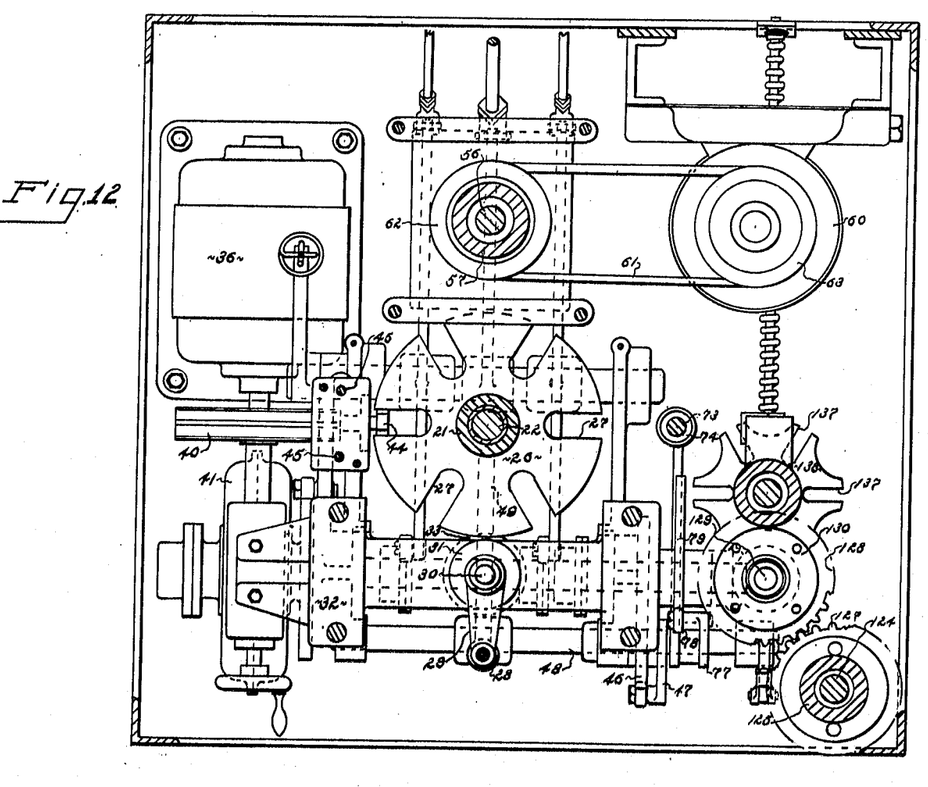
Figure 12 is a view taken on line 12—12, Figure 7.

The turret shaft 22 is arranged for vertical movement in the bearing support 21 and during the ware forming operation the Geneva 26 is positioned below the path traveled by the crank roller 28, see Figure 7, and is locked against rotation by a gib member 44 fixedly secured to the top plate 20, as by screws 45, Figure 12, the arrangement being such that at the end of an indexing operation one of the Geneva slots 27 is positioned in registration with the gib. Previous to the indexing operation, the shaft 22 and the turret carried thereby are elevated to move the Geneva 26 out of locking engagement with the gib 44 and to position the Geneva for engagement by the crank roller 23.

Vertical reciprocation of the turret is effected by a cam 46 mounted on the shaft 35 and which actuates an arm 47 fixed to a shaft 48 journalled in the lower ends of the depending side arms 32. An arm 49 is affixed centrally on the shaft 48 and extends inwardly and is connected at its inner end to a pair of links 50, the upper ends of which are connected to the lower end of the turret shaft 22 by means of a rotatable coupling not shown.

The moulds 54 are positioned in a chuck 55 for rotation during the forming operation. The chuck 55 is fixed to the upper end of a spindle 56, Figure 12, journalled vertically in a supporting member 57 extending upwardly and downwardly from the top plate 20, Figure 8. The spindle is rotated by a motor 60 through belts 61 trained over a pulley 62 affixed to the lower end of the spindle 56 and a pulley 63 affixed to the motor shaft.

The arrangement is such that the turret is indexed to position one of the mould carriers 25 in registration with the chuck 55, at which time the turret is lowered by cam 46, as previously described, whereupon the mould is deposited in the chuck. The chuck and mould are then rotated by the motor 60 and a forming tool fixed to an arm 65, Figure 5, is lowered into contact with the clay carried by the mould and the clay formed into a piece of ware. The arm 65 is actuated in timed relation by additional cams mounted on shaft 35. At the completion of the forming operation, the arm 65 and tool is raised and the turret is elevated by the cam 46, raising the mould out of the chuck, and the turret is then indexed to position the mould in registration with a pad or mould support 67. This pad is supported by a stem 68, see Figure 8, extending upwardly from one end of a cross member 69, see Figure 5. A similar pad 70 is carried by a stem 71 extending upwardly from the opposite end of the cross member 69. The cross member is mounted intermediate its ends on a stem 73 mounted for vertical movement in a supporting member 74, Figure 8, secured to the top plate 20. The lower end of the stem 73 is connected to a link 75, the lower end of the link being connected to an arm 76 formed integral with an arm 77 having a roller 78 engaging the periphery of a cam 79 mounted on shaft 35, the arms 76, 77, forming an angle lever rotatably mounted upon the shaft 48, see Figures 7 and 8. The cam functions to effect vertical reciprocation of the mould supporting pads 67, 70. The pads 67, 70 are arranged or spaced in registration with the mould carriers 25 during the dwell period of the turret, at which time one of the mould carriers is alined with the chuck 55. When the mould carrying members 25 of the turret are positioned in registration with the pads 67, 70, the pads are elevated by the cam 79, and the mould with the formed ware therein is removed from the turret by the pad 67. By mechanism hereinafter described, these moulds are advanced successively from the pad 67 through a drier. When the ware is properly dried, it is removed from the moulds and the empty moulds are returned to the pad 70. During each dwell period of the turret, the pads 67—70 are elevated and lowered by the cam 79. When the pad 70 moves downwardly, it deposits an empty mould in the carrier 25 positioned in registration with the pad. In the apparatus here shown the mould, with the formed ware therein positioned on pad 67, is transferred to an out-feed conveyor 82, and an empty mould is transferred from an in-feed conveyor 83 to the pad 70. The pads are then lowered, whereupon the empty mould is deposited in the carrier 25. The turret is indexed successively by the Geneva 26 and at one of the positions between the pad 70 and the mould chuck 55, a quantity of plastic clay is placed in or on the mould. The jigger, or ware forming machine, is more fully described in the copending application of Arthur J. Briggs, Sr. No. 111,032, filed August 18, 1949 and now Patent No. 2,629,159, also owned by the assignee of this application.

The moulds are transferred from the pad 67 and to the pad 70, by a transfer member comprising a cross member support 85 having arms 86, 87, Figure 5. On the end of each of the arms 86, 87, there is mounted circular shaped members 88, 89, respectively. These members are provided with brackets 90 affixed to the arms 86, 87, as by screws 91. Each of the members 88, 89, are formed with four depending portions 92, Figures 8 and 16, to the lower ends of which are pivotally mounted fingers 93 provided with blocks 94 of resilient material at the lower ends. The fingers 93 have inwardly extending projections 95 which coact with a disk member 96 carried on a stem 97 mounted for vertical movement in the members 88, 89, the vertical movement being effected in a downward direction by a compression spring 98, and in an upward direction by the application of compressed air through a hose 99 connected to a supply pipe 100 on the under side of a diaphragm 101. Upon the application of air under pressure to the heads 88, 89, the lower ends of the fingers 93 are caused to move radially inwardly to grip the rim portion of the mould 54 with sufficient pressure to transfer the mould upon oscillation of the support 85.

Figure 8:
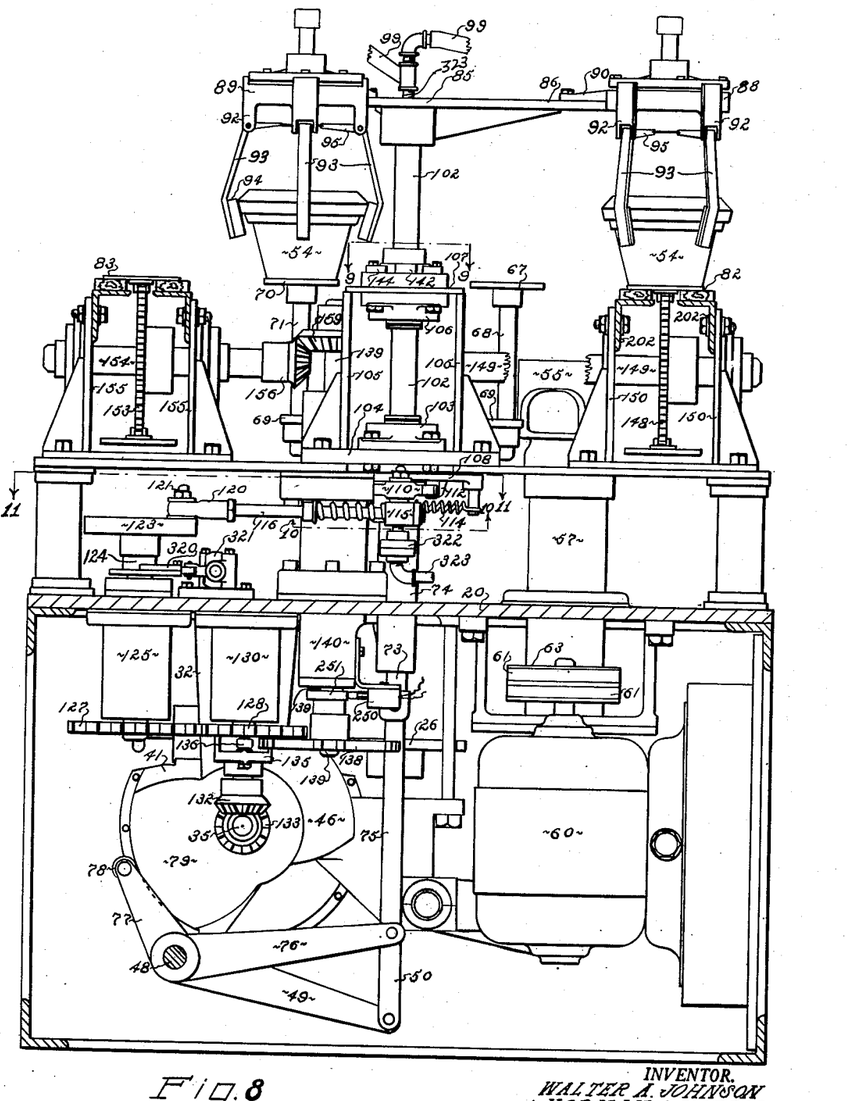
Figure 8 is an enlarged end elevational view, with parts in section, of the structure shown in Figure 7, looking to the left.
Figure 10:
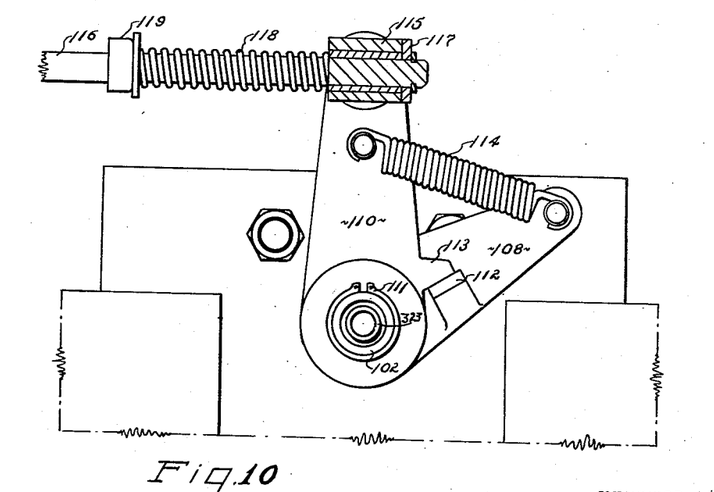
Figure 10 is a view taken on line 10—10, Figure 8.

The support 85 is affixed to the upper end of a tubular shaft 102 journalled vertically in a bearing 103 mounted on the bottom plate 104 of a boxlike structure having side members 105. Figure 8. The upper portion of the shaft is journalled in a bearing 106 mounted on a plate 107 fixed on the side walls 105. The shaft 102 has affixed to its lower end an arm 108, as by key 109, Figures 10 and 11, and directly below the arm 108, an arm 110 is journalled upon the shaft and is retained against downward movement by a snap ring 111 positioned in a groove in the shaft. The arms 108, 110, are formed with coacting stop projections 112, 113, respectively. The arms are yieldingly urged together with the stops 112, 113, in engagement by helical tension spring 114, see Figure 10.

Figure 11:
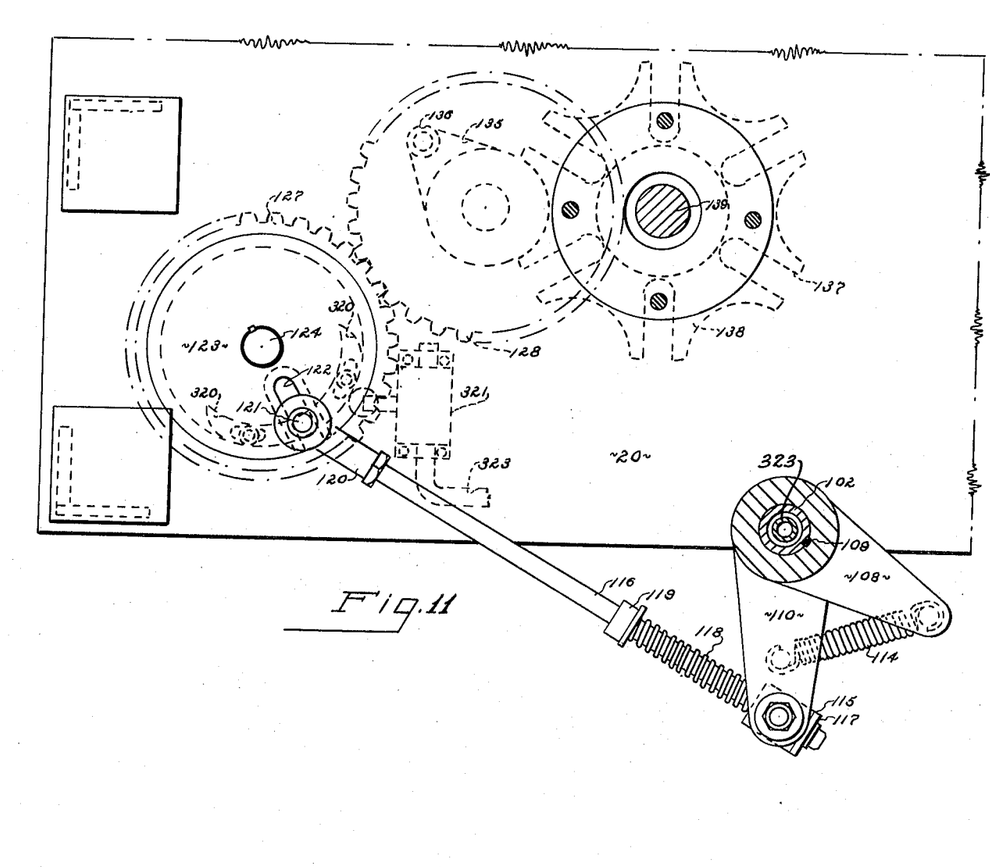
Figure 11 is a view taken on line 11—11, Figure 8.

A head 115 is pivotally secured to the arm 110 and is apertured to slidably receive a link 116 provided at its end with a fixed collar 117 abutting against one end of the head member 115, and the opposite end of the head member is engaged by a helical compression spring 118, the opposite end of which abuts against a fixed collar 119. The opposite end of the link 116, Figure 11, is provided with a head 120 apertured to receive a crank pin 121 adjustably mounted in a slot 122 formed in a crank disk 123 affixed to the upper end of a shaft 124. The shaft 124 is journalled vertically in a bearing member 125 carried by the top plate 20 and is provided on its lower end with a spur gear 127 arranged in mesh with a similar gear 128. The gear 128 is secured on a shaft 129, see Figure 12, which is journalled vertically in a bearing support 130 depending from the top plate 20, see Figure 8. The shaft 129 has affixed to its lower end a miter gear 132 arranged in mesh with a similar gear 133 mounted on the end of the main cam shaft 35, see Figures 7 and 8. Directly above the gear 132, a crank arm 135 is fixed to the shaft and has a roller 136 which is movable into and out of slots 137, see Figure 11, in a Geneva disk 138. The Geneva 138 is affixed to the lower end of a shaft 139 journalled vertically in a bearing housing 140 depending from and extending above the top plate 20, Fig. 8.

Figure 9:
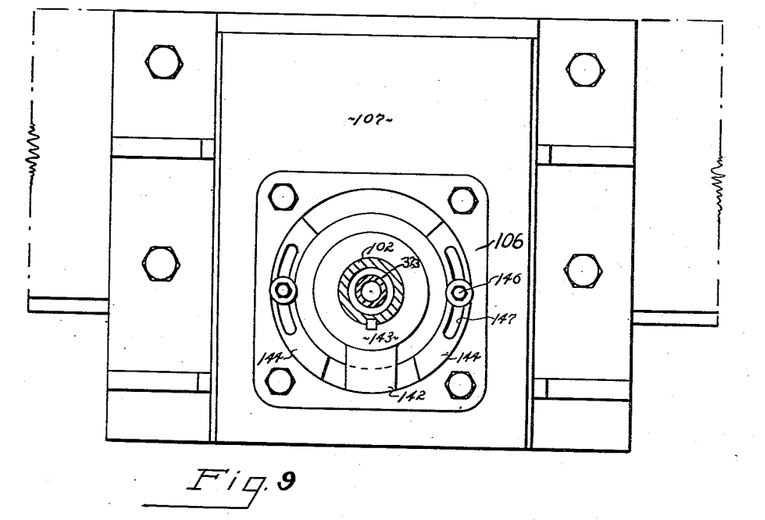
Figure 9 is a view taken on line 9—9, Figure 8.

Rotation is thus imparted to the shaft 124 effecting reciprocation of the link 116 and oscillation of the tubular shaft 102 on which the mould transfer members are mounted. The oscillatory movement of the transfer member 85 is controlled by a radial projection 142 on a hub member 143 affixed to the shaft 102, see Figure 9. This radial projection 142 is arranged to engage arcuate shaped stop members 144 mounted upon the upper bearing member 106, as by screws 146, extending through arcuate slots 147 in each of the members 144 to provide for circumferential adjustment of the members. The springs 114, 118, Figure 10, permit overrun of the link 116 in both directions after the projection 142 engages the adjustable stops 144.

The conveyor 82 is in the form of an endless belt movable over a driving sprocket 148 mounted upon a shaft 149 journalled in a boxlike structure having vertical side members 150 and also journalled in a bearing bracket 151, Figure 5, attached to the front wall of the boxlike structure carrying the bearings 103, 106, for the transfer shaft 102.

The conveyor 83 is of similar construction being driven by a sprocket 153 mounted on a shaft 154 journalled in another boxlike structure having side walls 155. This shaft has affixed to its inner end a bevel gear 156, and the shaft 149 has a similar gear 158, these gears meshing with a gear 159 affixed to the upper end of the shaft 139. By this arrangement, intermittent movement is imparted to the conveyors 82, 83, by means of the Geneva 138, the conveyor 82 moving away from the jigger and the conveyor 83 moving toward the jigger.

It will be apparent from the description thus far that moulds with formed ware therein are successively deposited upon the pad 67 and transferred therefrom to the outgoing conveyor 82 and simultaneously, empty moulds are transferred from the incoming conveyor 83 and deposited upon the pad 70 to be picked up by the turret mould carriers 25. In other words, the jigger or forming machine is automatically supplied with empty moulds, and filled moulds with formed ware therein, or thereon, are removed from the jigger.

Figure 6:
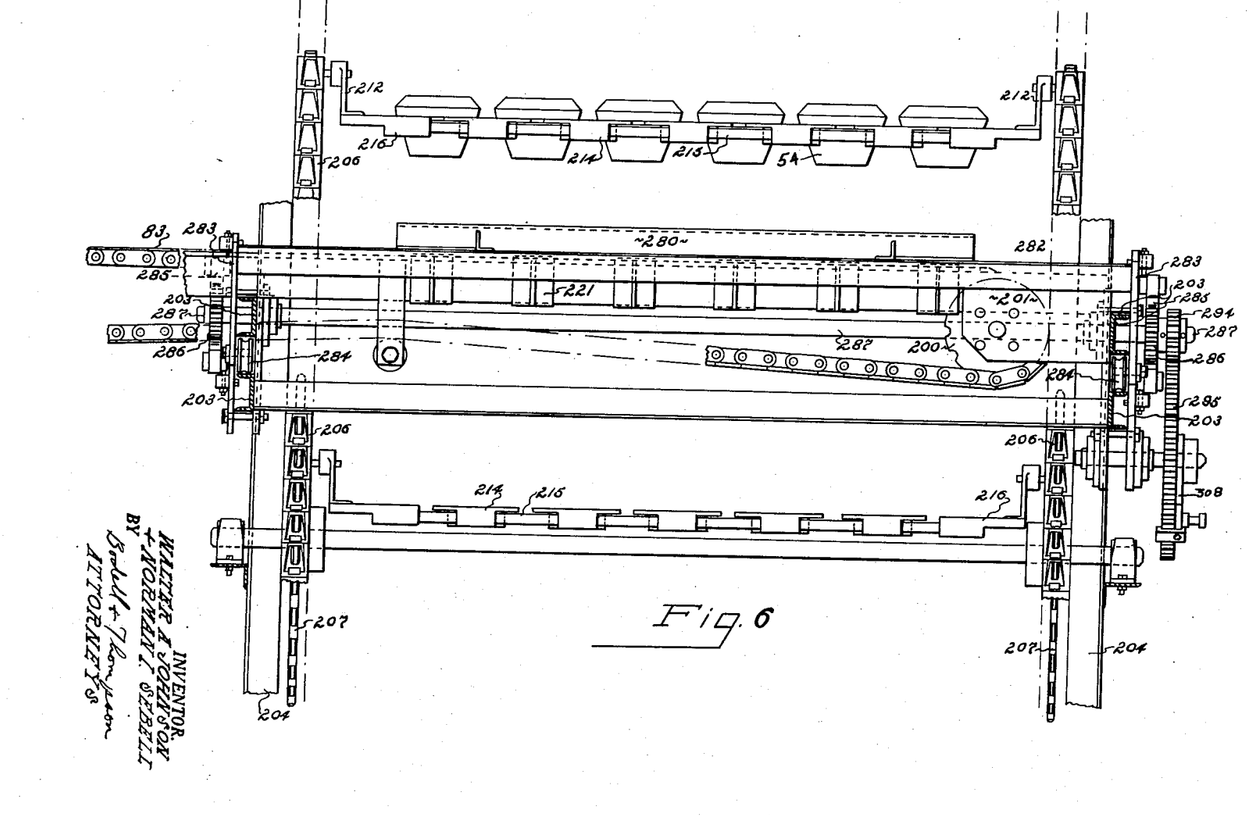
Figure 6 is an enlarged front elevational view of the structure shown at the right in Figure 1, with parts taken in section on line 6—6, Figure 3.

The conveyors 82, 83, extend outwardly from the jigger in parallel spaced apart arrangement, see Figure 3, the conveyor chains being trained about idler sprockets 200 journalled in plates 201 attached to side rail members 202 extending lengthwise of the conveyor. The plates 201 are welded or otherwise secured to the upper of a pair of channel members 203 extending transversely across the ends of the conveyor and being supported by vertical frame members 204, Figures 2 and 6.

The moulds containing the formed ware are conveyed through a drying oven, not shown, which may be of the type disclosed in Patent No. 2,470,638 of Clifford H. Parmelee, issued May 17, 1949, also owned by the assignee of this application, by an endless conveyor chain 206 trained over sprockets 207 having a vertical upward run, as at 208, and a downward vertical run, as at 209. The upward run is trained over a pair of sprockets 210, and the downward run over a pair of sprockets 211, see Figure 2.

The oven mould conveyor consists of a series of carriers provided at their ends with brackets 212 attached by trunnions to the chain 206. These carriers consist of a plurality of members 214, Figure 4, formed with concavities in their sides and being attached at like ends to a rod 215 extending between end members 216 to which the brackets 212 are secured. With this arrangement, the conveyor shelves are formed with circular concavities to receive the moulds and these concavities are open along one side of the shelf. The inner side rail member 202 of the conveyor 82 has projecting therefrom a series of stationary shelves or supports 220, these being so spaced as to extend into the concavities of the mould carrying shelves. In this case, the conveyor 82 is mounted outside of the vertical run 208, Figure 2, of the drier conveyor.

The outer side rail 202 of the conveyor 83 is provided with similar shelves 221 which also are spaced to extend into the concavities of the mould carrying shelves on the downward run 209 of the mould conveyor. In this case, the conveyor 83 is positioned on the inner side of the downward run of the mould conveyor.

The shelves 220, 221, are arranged in the plane of the conveyors 82, 83, and mechanism is provided for sliding the moulds to and from the respective conveyors and shelves 220, 221. When the moulds are positioned on the shelves 220, they are engaged by the members 214 upon upward movement of the upper run 208 of the mould conveyor and are thus picked off or transferred from the shelves 220 to the mould conveyor carriers. As the conveyors move downwardly in the downward run 209 of the oven conveyor, the moulds are deposited upon the shelves 221.

Figure 4:
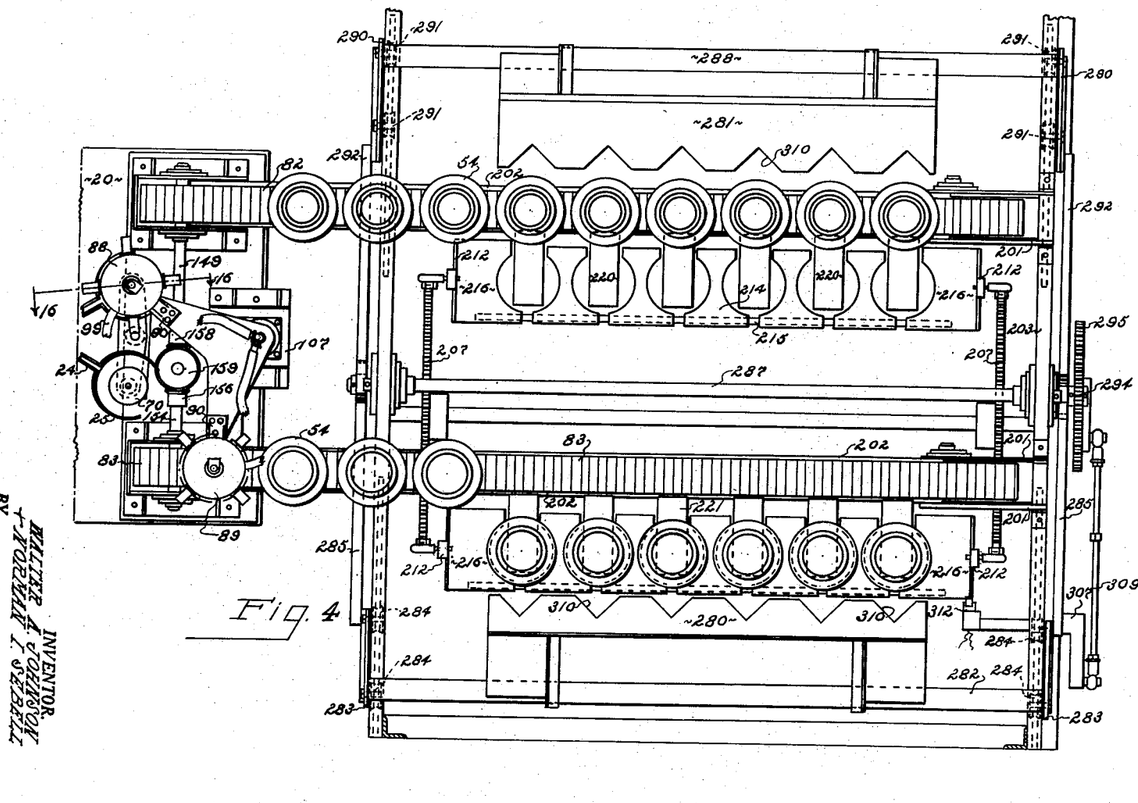
Figure 4 is an enlarged view taken on line 4—4, Figure 1.

It will be observed that there are a plurality of the shelves 220, 221. As shown in Figure 4, there are six shelves and the oven mould conveyor shelves are arranged to carry a row of six moulds. Accordingly, it is necessary for the conveyor 82 to be intermittently advanced six stations in order to provide a mould for each of the shelves 220 and, inasmuch as the downward run 209 of the oven conveyor will simultaneously deposit six empty moulds on the shelves 221, it is necessary that this conveyor be likewise advanced six steps between intermittent operations of the oven conveyor.

Figure 13:
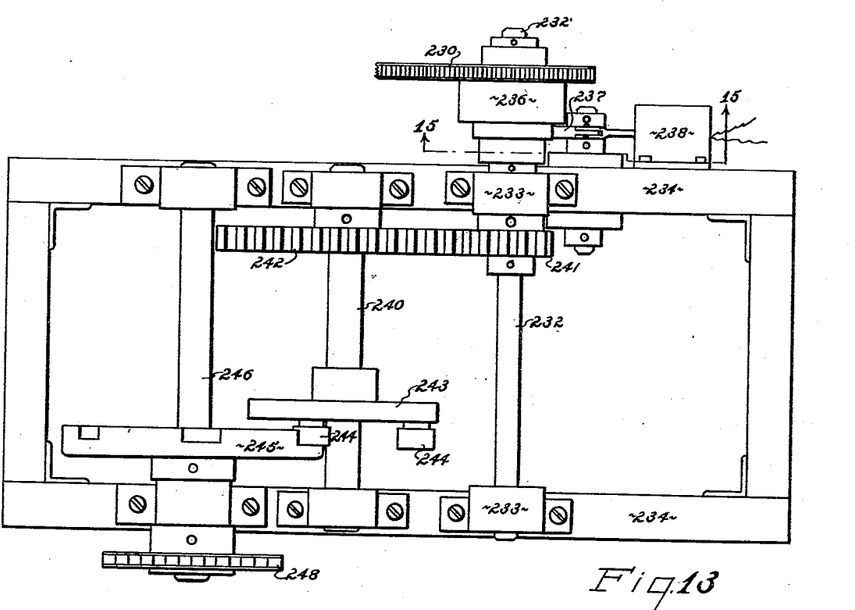
Figure 13 is a top plan view of the drive mechanism for the oven conveyor.
Figures 14, 15:
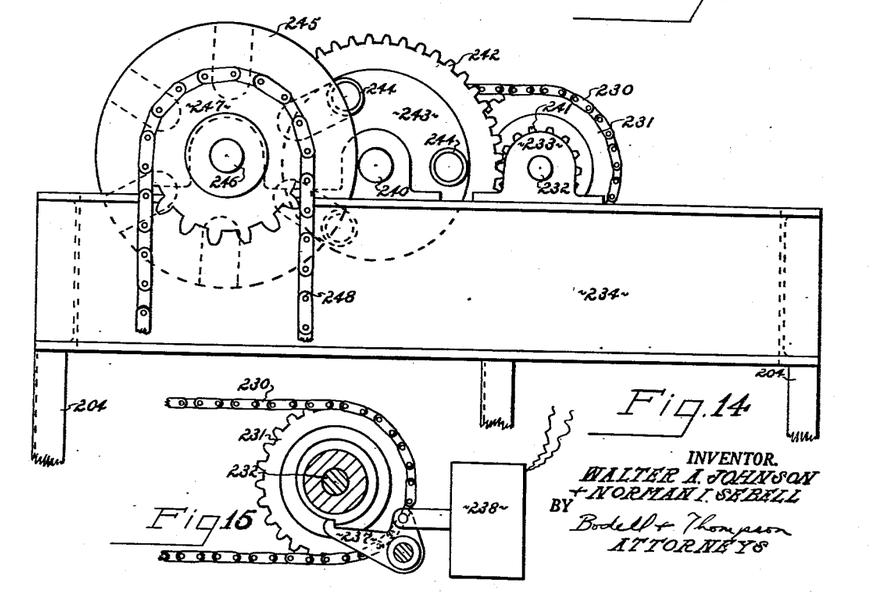
Figure 14 is a side elevational view looking upwardly, Figure 13.
Figure 15 is a view taken on line 15—15, Figure 13.

The oven conveyor is driven by a suitable source of power, such as an electric motor not shown, through a drive chain 230, see Figure 13, trained over a sprocket 231 mounted upon a shaft 232 journalled in bearings 233 mounted upon side members 234 of a framework mounted upon the uprights 204. The sprocket 231 is connected to the shaft 232 through a one revolution clutch indicated at 236, the operating latch 237 of which is controlled by a solenoid 238.

Figure 2:
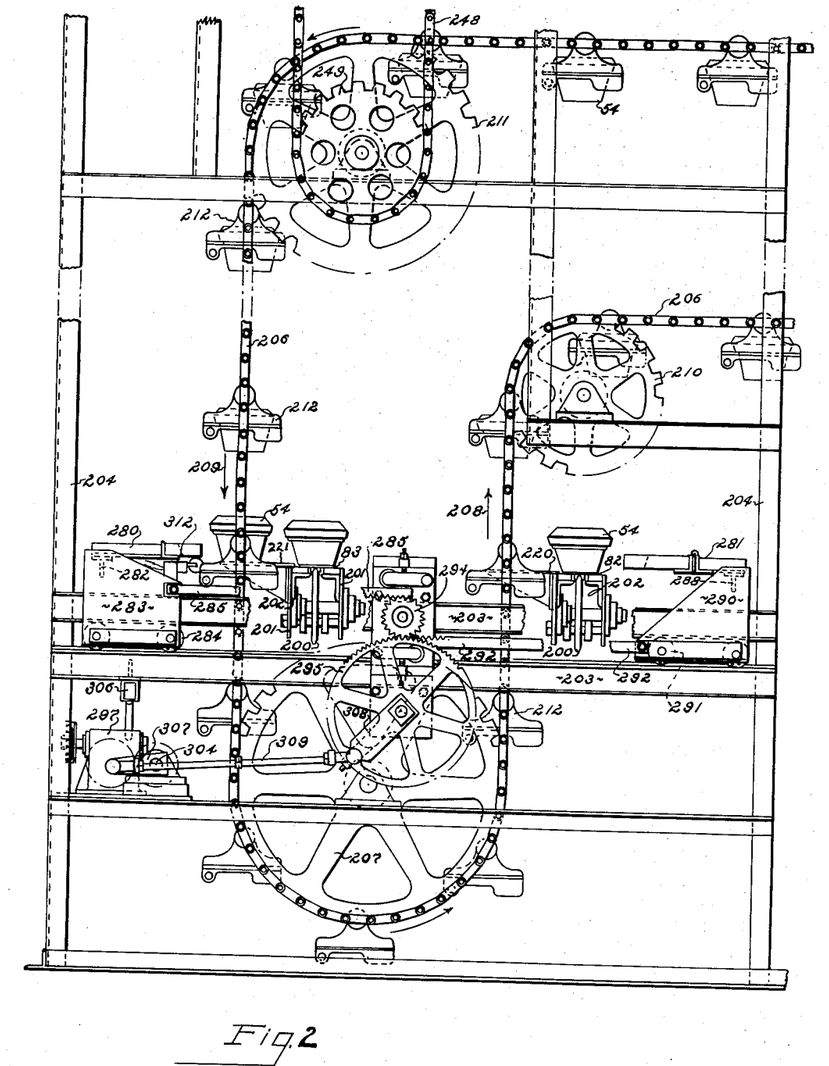
Figure 2 is an end elevational view looking to the left, Figure 1.

The shaft 232, Figure 13, is connected to a shaft 240 through gears 241, 242, and the shaft 240 has affixed to it a crank disk 243 provided with three rollers 244 arranged to actuate a Geneva 245 affixed to a shaft 246. A sprocket wheel 247 is secured to one end of the shaft 246, and a driving chain 248 is trained over this sprocket, and a sprocket 249 affixed to the shaft on which the conveyor sprockets 211, Figure 2, are mounted. The solenoid 238 is energized by a switch 250 actuated by a cam 251, Figure 8, mounted on the lower end of the shaft 139 forming part of the drive mechanism for the conveyors 82, 83. The arrangement is such that the switch 250 is closed when the conveyors 82, 83, have been advanced six steps. The solenoid 238 is then energized by the switch 250 and the crank disk 243 is rotated one-third of a revolution to effect one indexing movement of the Geneva 245 and thus advance the oven conveyor one step.

Each advancement of the conveyor chain 206 carries the descending mould carriers 214 just below the shelves 221 and actuates switch 312 just prior to the dwell position, as shown in Figure 2. The ascending mould carriers 214 come to dwell position, as shown in Figure 2, just below the shelves 220 at the same time. It is apparent therefor that a row of empty moulds has been picked out of the mould carriers 214 by the shelves 221 and the next step in the transfer operation ready to be performed. This transfer is effective by pusher bars 280, 281. The pusher bar 280 is mounted upon a beam 282 which, in turn, is supported at each end by a carriage consisting of a plate 283, see Figures 2 and 6, on which are journalled rollers 284 positioned between the horizontally extending channel members 203. The plate 283 has attached to it and extending toward the center of the machine a rack bar 285 arranged in mesh with the upper side of a pinion 286 mounted on a shaft 287. The pusher bar 281 is supported on a beam 288 carried at its ends by similar carriages formed with plates 290 and having rolls 291 positioned between the channel members 203 and having an inwardly extending rack bar 292 engaging the under side of the pinion 286. The shaft 287 has affixed to one end a pinion 294 arranged in mesh with a gear or quadrant 295 which is oscillated by a motor 296. The motor 296 is connected to a gear reducer 297, see Figure 17, by belt 298.

The output shaft of the gear reduction is provided with a gear 300 arranged in mesh with a gear 301. This latter gear is connected to a sleeve 302 journalled in bearings 303. The sleeve is connected to a shaft 304 journalled in the sleeve through a one revolution clutch indicated at 395. The trip of this clutch is operated by a solenoid 306. The outer end of the shaft 304 is fitted with a crank arm 307 which is connected to an arm 308 fixed to the gear 295 by a connecting link 309.

The arrangement is such that when the solenoid 306 is energized, the clutch 305 is unlatched, the shaft 304 makes one revolution during which the gear 295 is rotated in a clockwise direction, Figure 2, and then returned to the position shown in Figure 2. During the clockwise direction of the gear 295 and the pinions 286, the racks 285, 292, are moved toward each other, moving the pusher bars 280, 281, inwardly. These bars are provided with notches 310, there being a notch in registration with each mould and the inward movement of the pusher bar 280 engages the moulds on the shelves 221 and slides them onto the conveyor 83. The pusher bar 281 engages moulds on the conveyor 82 and slides them onto the shelves 220.

The solenoid 306 is energized by a switch 312, the actuator of which is engaged by the carriers on the oven conveyor in the downward run 209 just before the carriers stop in registration with the shelves 221, and the mechanism for reciprocating the pusher bars 280, 281, functions during the dwell period of the oven conveyor.

On the next advance of the oven conveyor, the filled moulds are removed from the shelves 220 by the oven conveyor mould carriers, and a carrier with a row of empty moulds is moved downward depositing a row of moulds on the shelves 221.

In operation, a quantity of plastic clay is placed in or on each empty mould carried by the mould supports 25. The turret is intermittently indexed and as each mould with the plastic clay therein is deposited into the mould chuck 55 by downward movement of the turret, the clay is formed into a piece of ware. The mould, with the formed ware therein, is removed from the chuck upon upward movement of the turret and in the next indexing operation, the mould is positioned in registration with the pad 67. On downward movement of the turret and upward movement of the pad 67, the mould is removed from the carrier 25 and positioned on a plane with the conveyor 82. During this operation, the transfer member 85 has moved in a counterclockwise direction, Figure 5, so that when the pad 67 has elevated the mould with the ware thereon, the fingers 93 will encircle the mould. At this time, cam 320, Figures 7, 8 and 11, opens the air valve 321 supplying air under pressure to the pipe 323 extending upwardly through the spindle 102. This pipe at its lower end is provided with a swivel union 322 and is connected at its upper end to the hose 99. With the compressed air supplied to the under side of the diaphragm 101, the fingers 93 are moved inwardly gripping the brim of the mould. Thereupon, the transfer member 85 is moved in a clockwise direction, positioning the mould on the carrier 82 and by this operation, an empty mould is transferred from the conveyor 83 to the pad 70. At the end of this clockwise movement, cam 320 functions to open the valve 321 connecting the pipe 323 to atmosphere, whereupon the spring 98 moves the stem 97 downwardly and moves the fingers 93 outwardly to disengage the moulds.

Figures 1, 17:
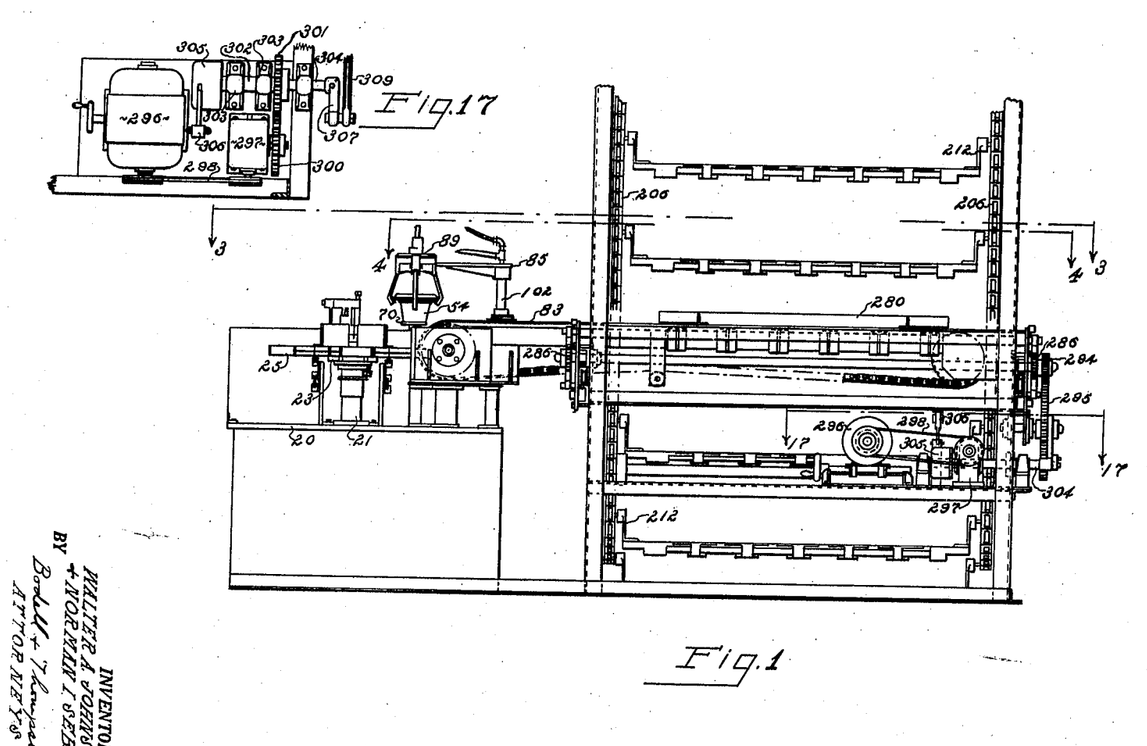
Figure 1 is a front elevational view of a mould handling apparatus embodying our invention.
Figure 17 is a plan view of the mould transfer drive mechanism taken on line 17—17, Figure 1.

Since Geneva wheel 138, Figure 11, has six slots therein, upon six indexing movements of the turret and six advancements of the conveyors 82, 83, the solenoid 238 on the oven conveyor drive, Figures 13 and 8, is energized by switch 250 and a mould carrier 212 is moved in juxtaposition to the fixed shelves 220, 221. When the mould carriers are so positioned, the clutch 305, Figure 17, is tripped by the switch 312, Figure 2, and the members 280, 281, are simultaneously moved towards the shelves 220, 221, to transfer the six filled moulds onto the shelves 220, and to transfer six empty moulds from the shelves 221 to the conveyor 83. Accordingly, the apparatus functions to automatically supply the mould carrying turret of the jiggering machine with empty moulds, and to transfer moulds with ware thereon from the jigger turret to the oven conveyor.

What we claim is:

1. Apparatus for handling pottery ware moulds comprising a drier conveyor having a portion in a vertical loop, said conveyor having a multiplicity of elongated mould carriers, each having a series of uniformly spaced mould pockets adapted to support a row of moulds, a fixed mould support arranged contiguous to the upward run of the conveyor in said loop portion and a fixed mould support arranged contiguous to the downward run of said loop portion, means operable to intermittently advance said conveyor, said carriers and supports being cooperable in the downward run of said loop portion to deposit empty moulds on the mould support contiguous thereto and in the upward run of the conveyor to remove moulds from the mould support contiguous to said upward run, a filled mould conveyor extending horizontally and parallel to the mould support contiguous to the upward run of the drier conveyor exteriorly of said loop and being operable to advance a row of moulds spaced complemental to said pockets in registration with said support, an empty mould conveyor extending horizontally and parallel to the mould support contiguous to the downward run of the drier conveyor interiorly of said loop and being operable to receive and advance a row of moulds from said support, means operable to intermittently move said filled and empty mould conveyors in timed relation to said drier conveyor, and mould pusher bars arranged in juxtaposition to said supports and being movable in a direction transversely thereof, the edges of said bars confronting the supports being formed with notches spaced complemental to said pockets, said pusher bars being operable simultaneously during the dwell period of said conveyors to slide a row of moulds from said filled mould conveyor to the contiguous support, and a row of empty moulds from the mould support contiguous to the downward run of the drier conveyor to said empty mould conveyor.

2. Apparatus for handling pottery ware moulds comprising a drier conveyor having a portion in a vertical loop, said conveyor having a multiplicity of elongated mould carriers, each having a series of uniformly spaced mould pockets adapted to support a row of moulds, a fixed mould support arranged contiguous to the upward run of the conveyor in said loop portion and a fixed mould support arranged contiguous to the downward run of said loop portion, means operable to intermittently advance said conveyor, said carriers and supports being cooperable in the downward run of said loop portion to deposit empty moulds on the mould support contiguous thereto and in the upward run of the conveyor to remove moulds from the mould support contiguous to said upward run, a filled mould conveyor extending horizontally and parallel to the mould support contiguous to the upward run of the drier conveyor exteriorly of said loop and being operable to advance a row of moulds spaced complemental to said pockets in registration with said support, an empty mould conveyor extending horizontally and parallel to the mould support contiguous to the downward run of the drier conveyor interiorly of said loop and being operable to receive and advance a row of moulds from said support, means operable to intermittently move said filled and empty mould conveyors in timed relation to said drier conveyor, a pair of guide rails extending transversely of said conveyors, a carriage movably mounted on said guide rails and being normally positioned exteriorly of the downward run of the drier conveyor, a pusher bar mounted on said carriage and being operable upon movement of said carriage toward said empty mould conveyor to slide a row of empty moulds from the mould support contiguous to said downward run of the drier conveyor to said empty mould conveyor, a second carriage mounted on said guide rails and being normally positioned exteriorly of said filled mould conveyor, a pusher bar mounted on said second carriage and being operable upon movement of said second carriage toward said filled mould conveyor to slide a row of filled moulds from said filled mould conveyor to the contiguous support, and motion transmitting means operable during the dwell period of said conveyors to simultaneously effect movement of said carriages toward and from said filled and empty mould conveyors.

3. Apparatus as defined in claim 2 wherein said pusher bars are each mounted upon carriages mounted on guide rails for movement transversely of said filled and empty mould conveyors, and motion transmitting means common to the carriages of both pusher bars and operable to effect simultaneous movement thereof toward and from said last mentioned conveyors.

References Cited in the file of this patent

UNITED STATES PATENTS

| Number | Name | Date |
| --- | --- | --- |
| 1,133,565 | Kankkonen | Mar. 30, 1915 |
| 1,549,070 | Dillon | Aug. 11, 1925 |
| 1,885,494 | Ulmann | Nov. 1, 1932 |
| 1,933,226 | Smith et al. | Oct. 31, 1933 |
| 2,038,518 | Badger et al. | Apr. 28, 1936 |
| 2,147,055 | Perkins | Feb. 14, 1939 |
| 2,247,787 | Schmidt | July 1, 1941 |
| 2,258,658 | Miller | Oct. 14, 1941 |
| 2,274,842 | McCann | Mar. 3, 1942 |
| 2,428,722 | Palmer | Oct. 7, 1947 |
| 2,452,858 | Miller | Nov. 2, 1948 |
| 2,470,638 | Parmelee et al. | May 17, 1949 |
| 2,499,602 | Miller | Mar. 7, 1950 |